April 14, 1959     F. H. BAILLY     2,882,175
POZZOLAN PLASTERBOARD
Filed Sept. 10, 1956
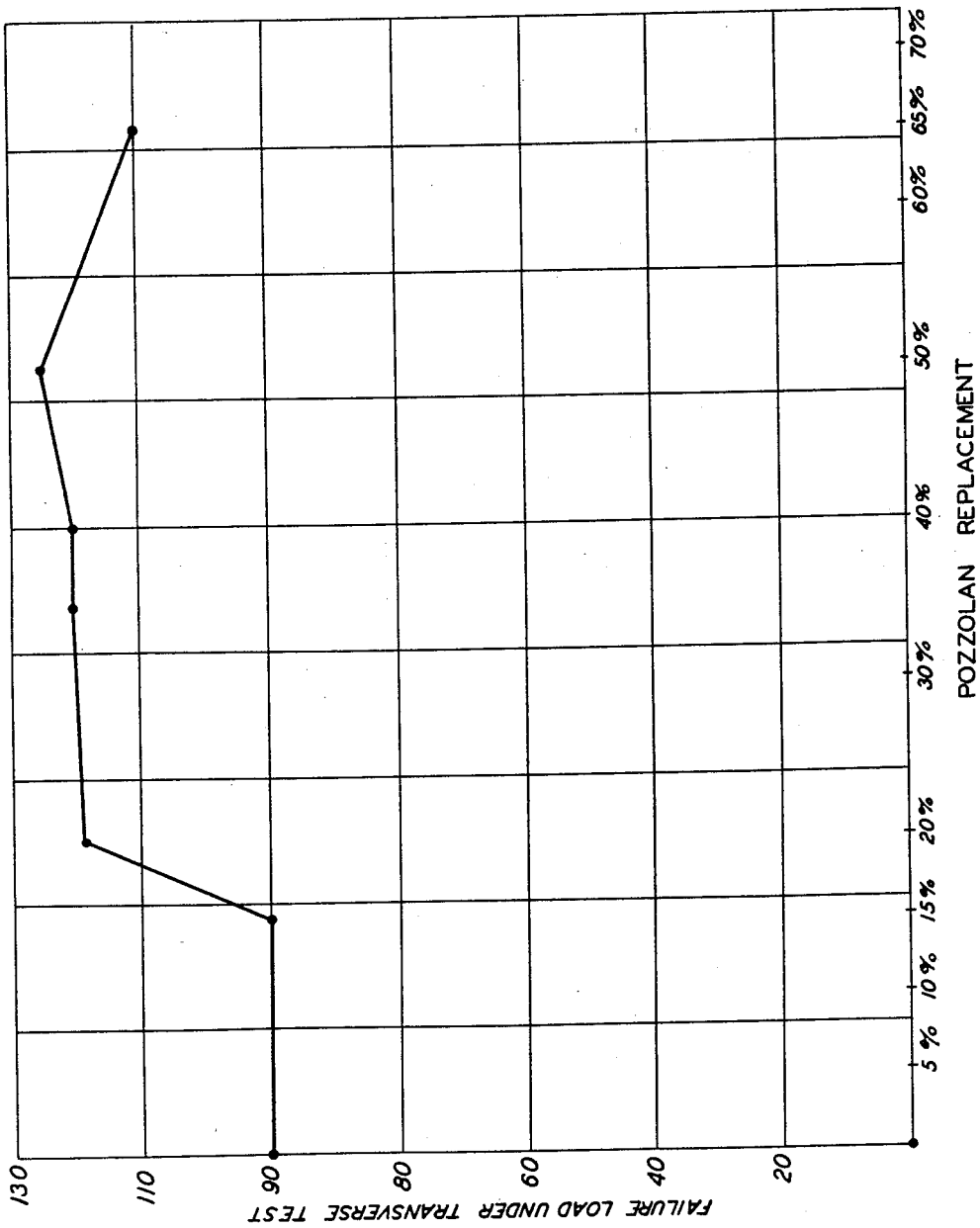
INVENTOR.
FLORENT H. BAILLY
BY
Christie, Parker & Hale
ATTORNEYS

*Oil-impregnated diatomaceous earth*

United States Patent Office 2,882,175
Patented Apr. 14, 1959

2,882,175
POZZOLAN PLASTERBOARD

Florent H. Bailly, Pasadena, Calif., assignor, by mesne assignments, to Florent H. Bailly, Pasadena, Calif.

Application September 10, 1956, Serial No. 608,881

2 Claims. (Cl. 106—115)

This invention provides an improved light weight plasterboard.

Plasterboards now in common use are made from gypsum plaster, water, a suitable foaming agent, an accelerator, a starch core adhesive, and a suitable filler, such as paper fiber, hair, or asbestos.

This invention provides an improved plasterboard which has a greater strength, lower density, increased resistance to heat and fire, and better insulation to heat and sound at a given air content than the conventional plasterboards now in use.

The improved plasterboard of this invention is obtained by replacing a portion of the gypsum plaster (calcined $CaSO_4 \cdot 2H_2O$) with a reactive pozzolan. For the purpose of this invention, the term "pozzolan" is defined as any natural or artificial finely pulverized siliceous material which, though not cementitious in itself, will combine in the presence of moisture with free lime and alkalies during the setting of a cement to form a hard insoluble silicate.

Natural pozzolans may be derived from volcanic rocks and include pumicites or volcanic ashes, pumice or pumicestone, obsidian, scoria, tuffs, and some of the andesites, or they may be derived from rocks or earth in which the silica has a high opaline content and include diatomites or diatomaceous earths, cherts, shale, clays and pure opal. Moreover, pozzolans include fly ash or flue dust, certain boiler and furnace slags, burnt ground brick and by-products of certain industrial processes.

It is generally agreed that silica and alumina are the active constituents of a pozzolan but no correlation has yet been shown between chemical analysis or mineral structure and pozzolanic activity, other than that a substantial portion of the silica constituent must be of an amorphous structure, and the presence of alumina and perhaps iron oxide and/or sodium and potassium oxides is required. It has been found that surface chemistry plays an important part in determining whether a material is pozzolanic in nature. A completely inert aggregate may, when ground to a fine mesh, behave as a pozzolan.

Specifications for the chemical composition of pozzolans are sometimes employed, but these are generally in the form of limits or ranges of composition to insure uniformity of the product. No definite chemical composition can be applied to pozzolanic materials in general.

The activity and utility of pozzolanic materials varies widely with type, calcination conditions (where the material is calcined), and particle size, which determines the specific surface of the material. In general, and for the purpose of this invention, the pozzolan should be ground to at least 100 mesh and preferably to a fineness so that at least about 92% of it will pass through 325 mesh. The specific surface of the ground material should be at least about 8000 square centimeters per gram.

Briefly, the invention contemplates an improved light weight plasterboard made of gypsum plaster, a filler, a pozzolan, and water. The presently preferred pozzolan is a calcined oil-impregnated diatomaceous earth.

The invention will be more fully understood from the following detailed description taken in conjunction with the accompanying drawing which is a graphic presentation of data showing how the substitution of pozzolan for a portion of gypsum plaster produces a plasterboard of increased strength.

A typical conventional plasterboard is made from the following ingredients:

| | | |
|---|---|---|
| Board stucco (gypsum plaster) | gms | 1400 |
| Paper fiber | gms | 14 |
| Accelerator ($K_2SO_4$ or gypsum) | gms | 3 |
| Starch core adhesive | gms | 14 |
| Water | ml | 975 |
| Foam (1½% rosin soap foamed to about 12#/cu. ft. foam) | cc | 300 |

A typical procedure for preparing plasterboard from the above ingredients is as follows: A dry mix is prepared by blending all of the dry ingredients. The dry mix is added to the water, which is previously placed in a large mixer, and allowed to soak for about ½ minute. The ingredients in the large mixer are then mixed at a medium speed for about one minute. The foam, which is formed in a separate mixer, is then added to the large mixer. The entire mixture is then mixed for an additional 1½ minutes.

The mixed slurry is then poured into a suitable mold on to an ivory face paper sheet which has previously been placed face down in the mold. The slurry is poured so that the majority of it is in the front section of the mold. A grey back paper sheet is placed on top of the slurry, and the slurry is rolled into a smooth board between the two pieces of paper. A weighted flat plate is placed on the board until it sets hard. After the board is set, it is removed from the mold and dried for ½ hour at 325° F., and then at 120° F. in a forced air circulation oven until it has a constant weight.

*Example I*

A conventional plasterboard 6" x 12" x ½" was made in accordance with the above procedure with a 40 pound flat plate to form the board. The board was allowed to cure for 30 days and the strength of the board was then measured by subjecting it to a test similar to the ASTM Transverse Test C26–52, paragraphs 36, 37 and 38. In the test, the board was placed between knife-edged supports with approximately a 10" span, and a load was applied uniformly at the mid-span across the board sample. The board weighed 800 gms. and failed at a total load of 90 pounds.

*Example II*

A plasterboard was made in accordance with the procedure indicated for the board of Example I, except that 15% (210 grams) of the gypsum plaster was replaced by a calcined oil-impregnated diatomaceous earth which had been ground so that 92% of it passed through 325 mesh, and so that it had a specific surface of more than 8000 square centimeters per gram. The diatomaceous earth was calcined at about 1600° F. to remove the oil and to increase its pozzolanic activity.

The board of this example weighed 780 gms., and when subjected to the same Transverse Test as was the board of Example I, failed at 90 pounds.

*Example III*

A plasterboard made by the same procedure as the board of Example II, except that 20% (280 grams) of the gypsum plaster was replaced by the calcined oil-impregnated diatomaceous earth. When subjected to a Transverse Test identical to that described in previous examples, the board failed at 118 pounds.

Example IV

A plasterboard made as described in the preceding examples, except that 35% (490 grams) of the gypsum plaster was replaced with the calcined oil-impregnated diatomaceous earth, weighed 770 gms., and failed at 120 pounds on the Transverse Test.

Example V

A 40% (560 grams) replacement of the gypsum plaster by the calcined oil-impregnated diatomaceous earth produced a board which weighed 768 gms., and which failed in the Transverse Test at 120 pounds.

Example VI

A 50% (700 grams) replacement of the gypsum plaster by the calcined oil-impregnated diatomaceous earth produced a board which failed on the Transverse Test at 126 pounds. The weight of this board was 748 grams.

Example VII

A 65% (910 grams) replacement of gypsum plaster by the calcined oil-impregnated diatomaceous earth produced a board which failed on the Transverse Test at 110 pounds. The weight of this board was 740 grams.

The plasterboards of Examples V, VI, and VII were all made as described for the boards of the preceding examples, except for the indicated amount of gypsum plaster replacement by calcined oil-impregnated diatomaceous earth.

The variation of board strength, as measured by the Transverse Test, with percentage replacement by pozzolanic material is shown graphically in the drawing, which indicates that a plasterboard of maximum strength is obtained by replacing approximately 50% of the gypsum plaster with a pozzolan. Such replacement also results in a board which is substantially lighter than the conventional plasterboard.

The improved strength of the plasterboard of this invention is undoubtedly due to the combination of the pozzolan with some soluble alkalies or surface reactive alkalies in the plasterboard to form a cementitious compound which adds to the strength of the finished product. If the quality of ingredients or formulation of the plasterboard is such that an insufficient amount of reactive alkalies are present, a small amount of lime, or other suitable alkali may be intermixed with the ingredients to react with the pozzolan.

I claim:

1. An improved light weight plaster which consists essentially of gypsum plaster, a filler, water, and between about 1 and about 9 parts by weight of calcined oil-impregnated diatomaceous earth to each 5 parts of the gypsum plaster.

2. A plaster according to claim 1 in which the diatomaceous earth is ground so that at least 92% of it passes through 325 mesh, and so that it has a surface area of at least 8000 square centimeters per gram.

References Cited in the file of this patent

UNITED STATES PATENTS

| | | |
|---|---|---|
| Re. 16,732 | Wig et al. | Sept. 6, 1927 |
| 914,317 | Shameah et al. | Mar. 2, 1909 |
| 1,251,841 | Thatcher | Jan. 1, 1918 |
| 2,650,171 | Schaaf | Aug. 25, 1953 |